United States Patent
Wang et al.

(10) Patent No.: US 8,070,115 B2
(45) Date of Patent: Dec. 6, 2011

(54) SUPPORT STAND FOR FLAT-PANEL MONITOR AND ELEVATING SUPPORT FOR SUPPORT STAND

(75) Inventors: Jin-Xin Wang, Shenzhen (CN); Jian Li, Shenzhen (CN); Zhi-Guo Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 644 days.

(21) Appl. No.: 12/195,438

(22) Filed: Aug. 21, 2008

(65) Prior Publication Data

US 2009/0166502 A1    Jul. 2, 2009

(30) Foreign Application Priority Data

Dec. 27, 2007   (CN) .......................... 2007 1 0203495

(51) Int. Cl.
*F16M 11/00* (2006.01)
*F16M 11/14* (2006.01)
*A47G 29/00* (2006.01)
*E04G 3/00* (2006.01)
*A47F 5/12* (2006.01)

(52) U.S. Cl. ...................... 248/157; 248/372.1; 248/917; 248/918; 248/919; 248/920; 248/921; 248/922; 248/923; 248/371; 248/183.3; 248/281.11; 248/133; 248/136; 248/150; 248/292.13

(58) Field of Classification Search .................. 248/157, 248/372.1, 917–923, 371, 284.1, 183.3, 281.11, 248/133, 136, 150, 149, 280.11, 292.11, 248/292.13

See application file for complete search history.

(56) References Cited

U.S. PATENT DOCUMENTS

| | | | | |
|---|---|---|---|---|
| 5,812,368 A * | 9/1998 | Chen et al. | ............... | 361/679.06 |
| 6,695,274 B1 * | 2/2004 | Chiu | ............... | 248/371 |
| 7,061,753 B2 * | 6/2006 | Michoux et al. | ......... | 361/679.05 |
| 7,252,277 B2 * | 8/2007 | Sweere et al. | ................ | 248/371 |
| 7,401,717 B2 * | 7/2008 | Chen | ............... | 224/413 |
| 7,431,254 B2 * | 10/2008 | Cheng | ...................... | 248/292.12 |
| 7,488,136 B2 * | 2/2009 | Chen et al. | ................... | 403/157 |
| 7,567,436 B2 * | 7/2009 | Jeong | ....................... | 361/679.22 |
| 7,614,594 B2 * | 11/2009 | Baek et al. | ................. | 248/274.1 |

(Continued)

FOREIGN PATENT DOCUMENTS

CN        2504675 Y       8/2002

(Continued)

*Primary Examiner* — Terrell McKinnon
*Assistant Examiner* — Christopher Garft
(74) *Attorney, Agent, or Firm* — Altis Law Group, Inc.

(57) ABSTRACT

An exemplary support stand (102) for a flat-panel display body includes an elevating support (30), a monitor bracket (50), and a support member (20). The elevating support includes a first chassis (321), a second chassis (322), a plurality of supporting blocks (3231) for connecting end portions of the first chassis and the second chassis, an elastic member (391), a first pivot subassembly (305), and a second pivot subassembly (306). The monitor bracket is rotatably connected to the first pivot subassembly. The support member is rotatably connected to the second pivot subassembly. The elastic member is capable of exerting a rebound force on two of the first chassis, the second chassis, and the supporting blocks. The first and second pivot subassemblies are fixed to the supporting blocks. The monitor bracket and the support member are rotatably connected to the first and second pivot subassembly correspondingly.

14 Claims, 9 Drawing Sheets

U.S. PATENT DOCUMENTS

| | | | |
|---|---|---|---|
| 7,694,929 B2 * | 4/2010 | Jang | 248/372.1 |
| 7,770,856 B2 * | 8/2010 | Depay | 248/284.1 |
| 2004/0021051 A1 * | 2/2004 | Chiu | 248/371 |
| 2006/0032998 A1 * | 2/2006 | Depay | 248/291.1 |
| 2007/0029457 A1 * | 2/2007 | Baek | 248/372.1 |
| 2008/0277539 A1 * | 11/2008 | Lee et al. | 248/157 |

FOREIGN PATENT DOCUMENTS

| | | |
|---|---|---|
| CN | 2566418 Y | 8/2003 |
| CN | 2819385 Y | 9/2006 |
| JP | 8161077 A | 6/1996 |
| TW | 537480 | 6/2003 |

* cited by examiner

SUPPORT STAND FOR FLAT-PANEL MONITOR AND ELEVATING SUPPORT FOR SUPPORT STAND

BACKGROUND OF THE INVENTION

1. Field of the Invention

The present invention relates generally to support stands and, particularly, to a support stand for a flat-panel display body.

2. Discussion of the Related Art

Flat-panel display bodies, such as liquid crystal display (LCD) monitors, offer advantages, over cathode ray tubes (CRTs) such as a greatly reduced size, and better image quality. Furthermore, because of the small weight of the flat-panel display body, the viewing angle and the height of the flat-panel display body can be adjusted without moving a base of a support stand of the flat-panel display body.

A typical support stand generally includes a monitor bracket for attaching to the flat-panel display body, a rotatable bracket for fixing the monitor bracket, an elevating support, a support member, and a base member for mounting the support member. The rotatable bracket is rotatably hinged to an end of the elevating support by a first hinge assembly. The support member is hinged to another end of the elevating support by a second hinge assembly.

A viewing angle of the flat-panel display body mounted on the typical elevating support can be adjusted by rotating the rotatable bracket relative to the elevating support. A height of the flat-panel display body can be adjusted by rotating the elevating support relative to the support member. A frictional force between components of the elevating support balances a gravitational force of the flat-panel display body, thus the flat-panel display body may be retained at a desired position. However, the components of the elevating support may become loose when the elevating support is used for a certain time. As a result, the flat-panel display body may not remain stable at the height selected by a user. Therefore, the typical elevating support has a relatively short usage life.

Therefore, a new support stand for a flat-panel display body is desired in order to overcome the above-described shortcomings.

SUMMARY

In one aspect, a support stand for a flat-panel display body includes an elevating support, a monitor bracket, and a support member. The elevating support includes a first chassis, a second chassis, a plurality of supporting blocks for connecting end portions of the first chassis and the second chassis, an elastic member, a first pivot subassembly, and a second pivot subassembly. The monitor bracket is rotatably connected to the first pivot subassembly. The support member is rotatably connected to the second pivot subassembly. The elastic member is capable of exerting a rebound force on two of the first chassis, the second chassis, and the supporting blocks. The first and second pivot subassembly are fixed to the supporting blocks. The monitor bracket and the support member are rotatably connected to the first and second pivot subassembly correspondingly.

In another aspect, an elevating support, used for a support stand of a flat-panel display body, includes a first chassis including end portions, a second chassis including end portions, a plurality of supporting blocks, an elastic member, a first pivot subassembly, a second pivot subassembly, two rotatable brackets, and a connecting base. The supporting blocks are configured for connecting end portions of the end portions of the first chassis and the second chassis. The elastic member is capable of exerting a rebound force on two of the first chassis, the second chassis, and the supporting blocks to make the first chassis and the second chassis tend to elevate. The first pivot subassembly is fixed to the supporting blocks connected to a first end portion of the first chassis and the second chassis. The second pivot subassembly is fixed to the supporting blocks connected to a second end portion of the first chassis and the second chassis opposite to the first end portions. The rotatable brackets are rotatably connected to the first pivot subassembly. The connecting base is rotatably connected to the second pivot subassembly.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat-panel display body. Moreover, in the drawings, like reference numerals designate corresponding parts throughout the several views.

DETAILED DESCRIPTION OF THE EMBODIMENTS

Figure 1:
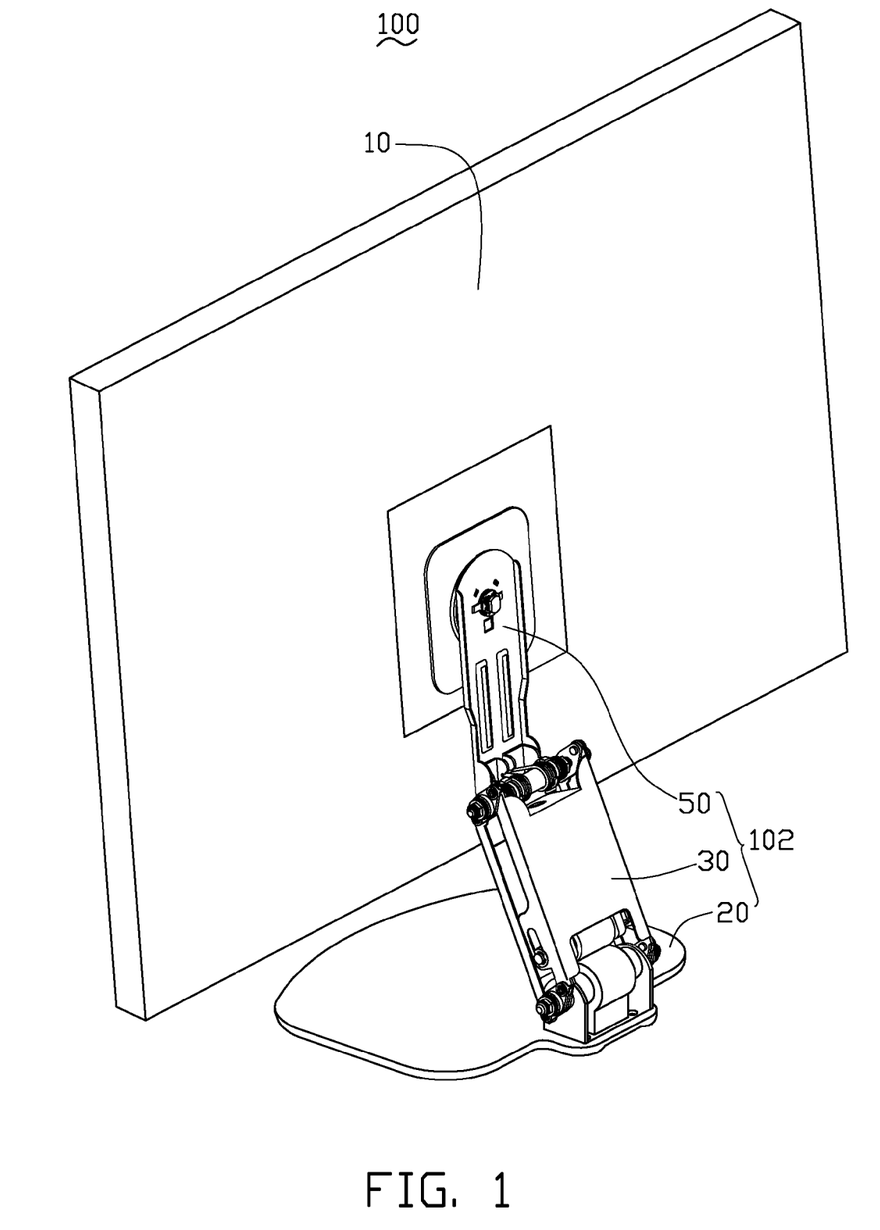
FIG. 1 is an isometric view of a flat-panel display body having a support stand in accordance with an exemplary embodiment of the present application.

Reference will now be made to the drawings to describe the embodiments of the present support stand and elevating support in detail. Referring to FIG. 1, a flat-panel display body 100 includes a display body 10 and a stand support 102. The stand support 102 includes a support member 20, an elevating support 30, and a monitor bracket 50 for holding the flat-panel display body. An end of the elevating support 30 is connected to the support member 20 and another end of the elevating support 30 opposite to the support member 20 is rotatably attached to the monitor bracket 50.

Figure 2:
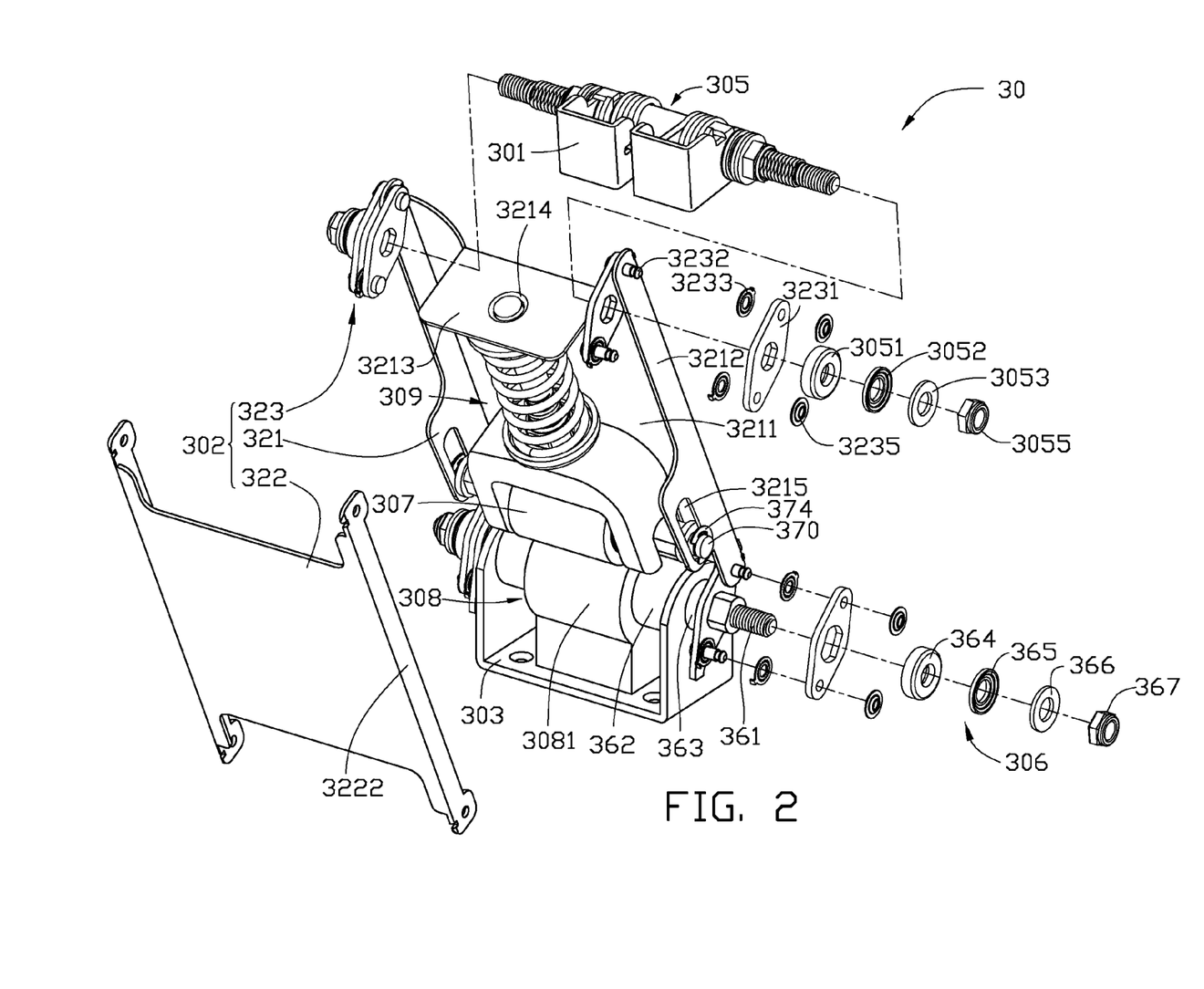
FIG. 2 is a partially disassembled, isometric view of an elevating support of the support stand in FIG. 1.

Referring to FIG. 2, the elevating support 30 includes a pair of rotatable brackets 301, a bracket subassembly 302, a connecting base 303, a first pivot subassembly 305, a second pivot subassembly 306, a roller 307, a resisting member 308, and an elastic subassembly 309. A first end of the bracket subassembly 302 is rotatably connected to the rotatable brackets 301 via the first pivot subassembly 305. A second end opposite to the first end of the bracket subassembly 302 is rotatably connected to the connecting base 303 via the second pivot subassembly 306.

Figure 3:
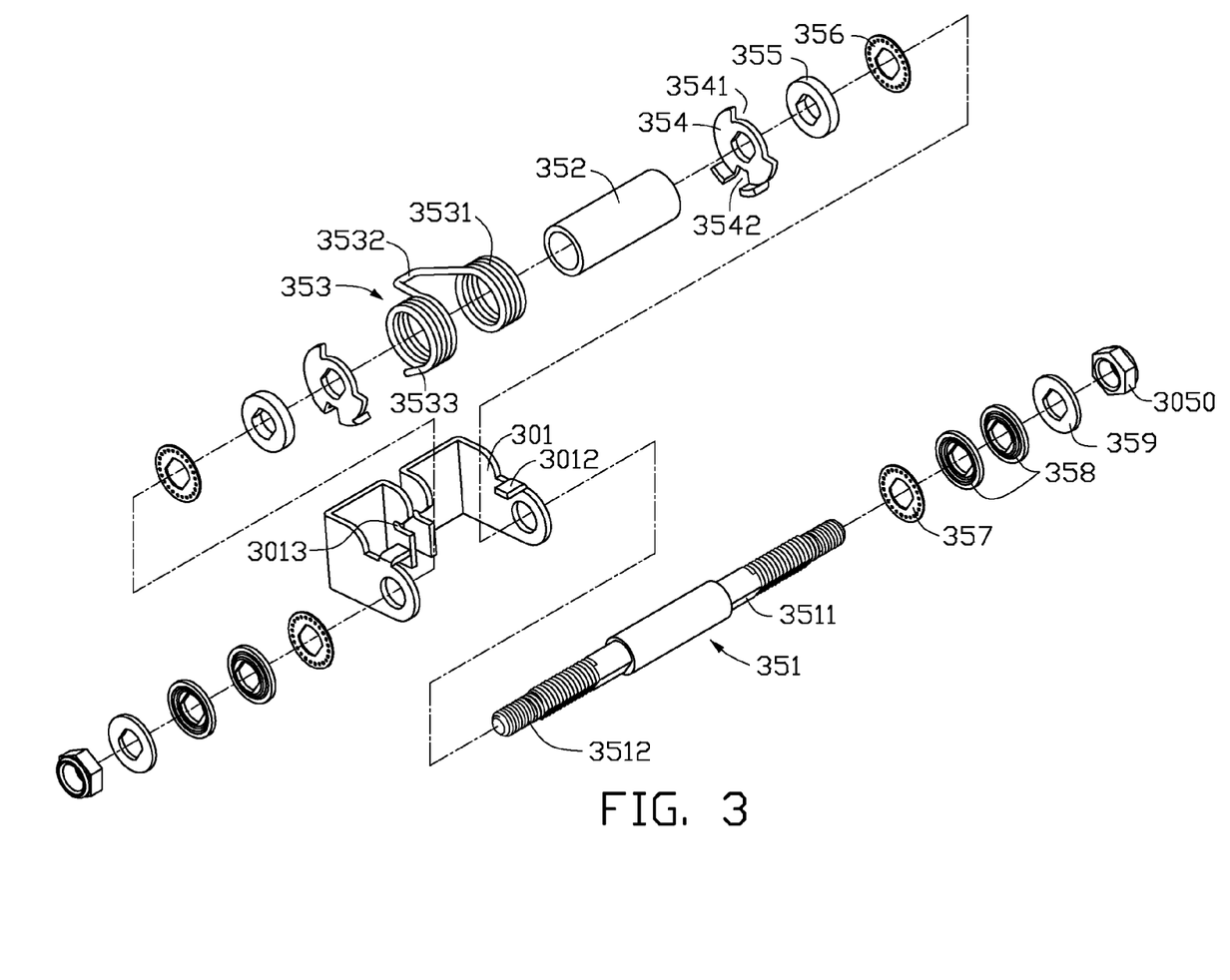
FIG. 3 is an exploded, isometric view of a pair of rotatable brackets and a first pivot subassembly in FIG. 2.

Referring also to FIG. 3, each of the rotatable brackets 301 forms a restricting block 3012 and a notch 3013. The rotatable brackets 301 are rotatably connected to the first pivot subassembly 305. The monitor bracket 50 is fixed to the rotatable brackets 301. The rotatable brackets 301 may be integrally formed. The number of the rotatable brackets 301 may be more than two.

The bracket subassembly 302 includes a first chassis 321, a second chassis 322, and four supporting assemblies 323 (a first supporting assembly, a second supporting assembly, a third supporting assembly, and a fourth supporting assembly). The first chassis 321 includes a flat base 3211, two side walls 3212 extending perpendicularly from opposite sides of the flat base 3211, and a resisting wall 3213 defining a through hole 3214. The resisting wall 3213 extends perpendicularly from a top end of the flat base 3211 and perpendicularly relative to the side walls 3212. Each of the side walls 3212 defines a guiding slot 3215.

The second chassis 322 is similar to the first chassis 321 except that the second chassis 322 does not include a resisting wall, and side walls 3222 of the second chassis 322 does not define guiding slots.

Each of the supporting subassemblies 323 includes a pair of supporting blocks 3231, a pair of pivot shafts 3232, four tab washers 3233, a pair of resilient rings 3235.

Each of the supporting blocks 3231 defines two pivot holes (not labeled) adjacent to two end portions and a fixing hole (not labeled) in a middle portion. Each of the supporting subassemblies 323 is rotatably attached to ends of the first chassis 321 and the second chassis 322 via the pivot holes of the supporting blocks 323 and the pivot shafts 3232. Two supporting subassemblies 323 are fixed to the first pivot subassembly 305 via the fixing holes of the supporting blocks 3231. The other two supporting subassemblies 323 are fixed to the second pivot subassembly 306 via the fixing holes of the supporting blocks 3231.

The connecting base 303 is substantially U-shaped. The connecting base 303 includes two parallel side walls (not labeled). Each side wall of the connecting base 303 defines a through hole (not shown).

The first pivot subassembly 305 includes a first pivot shaft 351, a sleeve 352 sleeved on the first pivot shaft 351, a torsion spring 353 sleeved on the sleeve 352, and two first hinge subassemblies (not labeled). The sleeve 352 is sleeved on a middle portion of the first pivot shaft 351. The torsion spring 353 is sleeved on the sleeve 352. The first hinge subassemblies are attached to opposite shaft portions of the first pivot shaft 351 correspondingly. Each of the first hinge subassemblies includes a limiting washer 354, a first pressing washer 355, a first protecting washer 356, a second protecting washer 357, two first resilient rings 358, a first washer 359, a adjustable nut 3050, a second resilient ring 3051, a second pressing washer 3052, a second washer 3053, and a nut 3055.

The first pivot shaft 351 is substantially cylindrical, and includes two shaft portions 3511 at opposite ends. The shaft portion 351 defines a thread (not labeled) on a distal end portion. The shaft portion 3511 is non-circular. In this embodiment, a cross-section taken perpendicular to a central axis of the shaft portion 3511 is double D-shaped, thereby forming two flat surfaces. Thus, the thread is discontinuous.

The torsion spring 353 includes two torsion portions (not labeled), an n-shaped connecting portion 3532 for connecting the torsion portions. Each of the torsion portions of the torsion spring 353 includes a latching end 3533.

The limiting washer 354 defines a deformed hole (not labeled) in a middle. The shape and size of the deformed hole corresponds to a cross-section of the shaft portion 3511. The limiting washer 354 defines a restricting groove 3541 and a latching groove 3542 on a periphery.

The second pivot subassembly 306 includes a second pivot shaft 361 and two second hinge subassemblies (not labeled). The resisting member 308 is sleeved on a middle portion of the second pivot shaft 361. The second hinge subassemblies are attached to opposite shaft portions of the second pivot shaft 361. Each of the second hinge subassembly includes a block 362, two resilient rings 363, 364, a resilient washer 365, a washer 366, and a nut 367.

Figure 4:
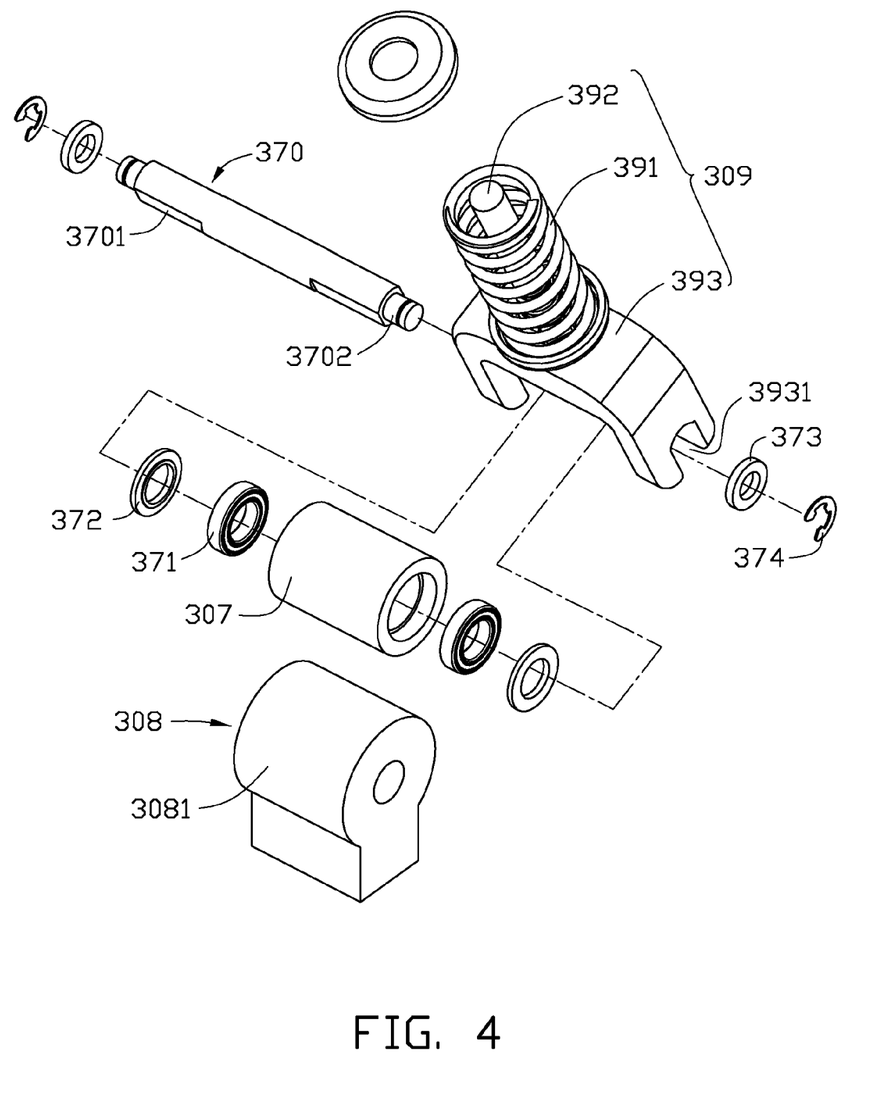
FIG. 4 is an exploded, isometric view of an elastic subassembly, a roller, a shaft, a resisting portion of FIG. 2.
Figure 5:
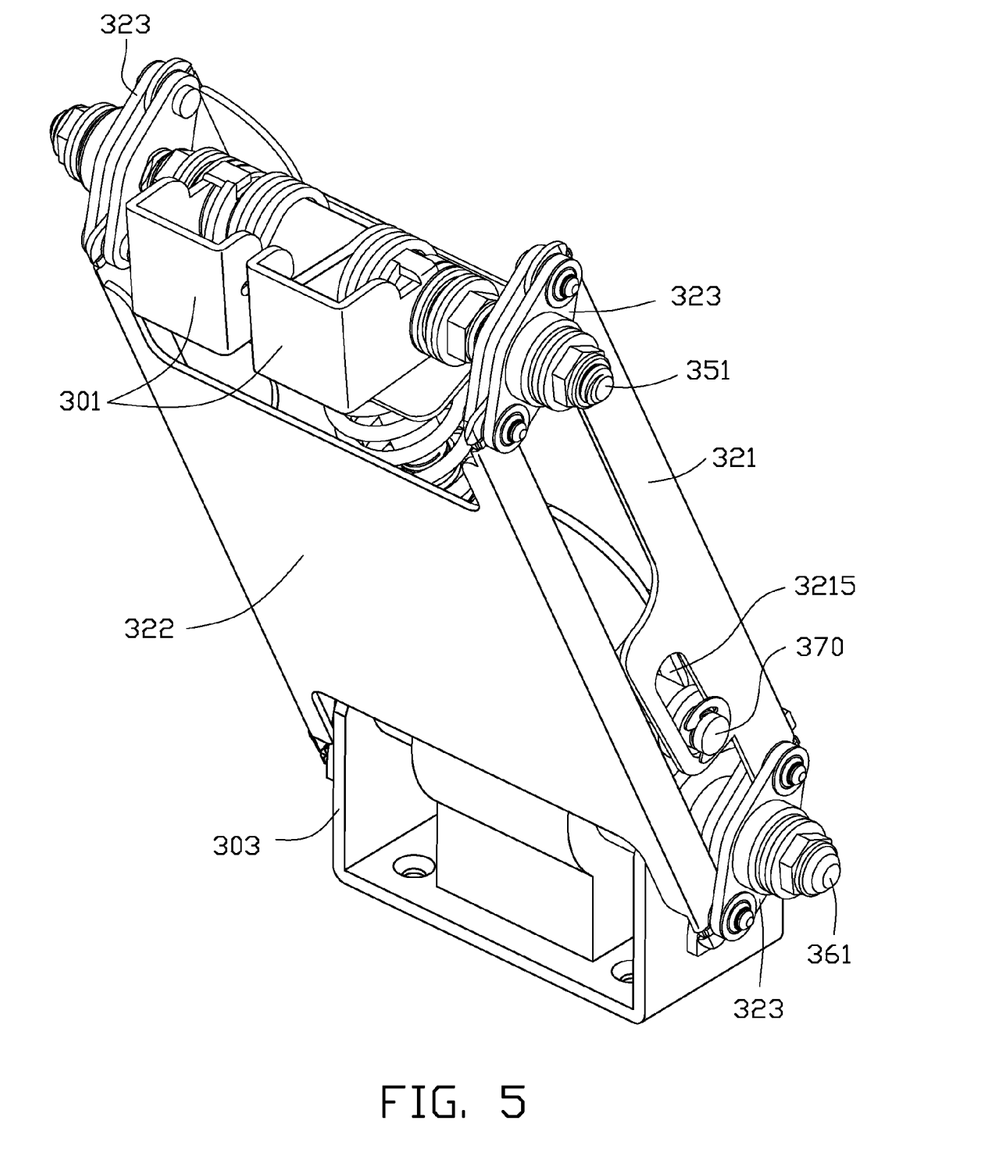
FIG. 5 is an assembled, isometric view of the elevating support of FIG. 2.

Referring to FIG. 2 and FIG. 4, the roller 307 is substantially a hollow cylinder. The roller 307 is rotatably disposed between the two guiding slots 3215 of the first chassis 321 via a shaft 370. The shaft 370 is substantially cylindrical, and includes two latching ends 3701 at opposite ends. The latching end 3701 forms a restricting pole 3702 on a distal end portion. The latching end 3701 is non-circular, and in a preferred embodiment has a double D shape. The roller 307 is sleeved on a middle portion of the shaft 370. Each end of the shaft 370 is configured to extend through a bearing 371, a first washer 372, a holding groove 3931 of a pressing block 393, a second washer 373, and the guiding slot 3215 of the first chassis 321 in that order. A clip ring 374 is configured to engage in a latching groove of the restricting pole 3702 so as to prevent the shaft 370 from being detached from the first chassis 321.

The resisting member 308 includes a cylindrical portion 3081 and a fixing portion (not labeled) extending from the cylindrical portion 3081. The resisting member 308 is fixed to a surface of the connecting base 303. The resisting member 308 is configured to resist the roller 307.

The elastic subassembly 309 includes a spring 391, a guiding shaft 392, and the pressing block 393. The spring 391 is sleeved on the guiding shaft 392. Two ends of the guiding shaft 392 are connected to the pressing block 393 and the resisting wall 3213 of the first chassis 321 correspondingly. The pressing block 393 is substantially U-shaped. Each end of the pressing block 393 defines the holding groove 3931. The holding grooves 3931 are configured to non-rotatably latch on to the latching ends of the 370 correspondingly.

Alternatively, the guiding slots 3215 of the first chassis 321 may be replaced by a pair of guiding rails. In such cases, the restricting pole 3702 of the shaft 370 is slidably connected to the guiding rails. The pressing block 393 may be other shapes, such as a cuboid defining a holding groove.

Referring to FIGS. 2 through 5, in assembly of the elevating support 30, the roller 307 and the elastic subassembly 309 are attached to the first chassis 321 via the shaft 370 and the guiding shaft 392 of the elastic subassembly 309. The restricting pole 3702 of the shaft 370 is slidably received in the restricting holes 3215 of the first chassis 321. Then, ends of side walls 3212 of the first chassis 321 and ends of side walls 3222 of the second chassis 322 are rotatably connected to the supporting subassemblies 323.

The sleeve 352 is sleeved on the middle portion of the first pivot shaft 351. The torsion spring 353 is sleeved on the sleeve 352. Then, each opposite shaft portions of the first pivot shaft 351 is passed through the components of each first hinge subassembly such as the limiting washer 354, the first pressing washer 355, the first protecting washer 356, the rotatable bracket 301, the second protecting washer 357, two first resilient rings 358, the first washer 359, the adjustable nut 3050, and the supporting assembly 323 in that order. The connecting portion 3532 of the torsion spring 353 engages in the notch 3013 of the rotatable bracket 301. The latching ends 3533 of the torsion spring 353 is inserted into the latching groove 3542 of the limiting washers 354. Thus, the first pivot subassembly 305 is connected to the supporting subassemblies 323. After that, each opposite shaft portions of the first pivot shaft 351 is passed through the components of each first hinge subassembly such as the second resilient ring 3051, the second pressing washer 3052, and the second washer 3053 in that order. The nuts 3055 then engages with each end of the first pivot shaft 351 correspondingly.

The resisting member 308 is sleeved on the middle portion of the second pivot shaft 361 of the second pivot subassembly 306. Then, each opposite portions of the second pivot shaft 361 is passed through the components of each second hinge subassembly such as the block 362, the side wall of the connecting base 303, a resilient ring 363, the supporting subassembly 323, the resilient ring 364, the resilient washer 365, and the washer 366 in that order. The nuts 367 engage with distal ends of the second pivot shaft 361. As such, the other end of the bracket subassembly 302 is rotatably connected to the connecting base 303 via the second pivot subassembly 306. The resisting member 308 is fixed to the connecting base 303. The cylindrical portion 3081 of the resisting member 308 resists the roller 307.

When the stand support 102 is used for supporting a flat-panel display body, an end of the monitor bracket 50 of the stand support 102 is fixed to a display body 10 of the flat-panel display body 100, and another end opposite to the display body 10 is fixed to the rotatable bracket 301 of the elevating support 30. The connecting base 303 is fixed to the support member 20. In use, a force is applied on the display body 10 for rotating the display body 10 with the rotatable bracket 301 relative to the bracket subassembly 302 along an axis of the first pivot shaft 351 of the first pivot subassembly 305, thereby adjusting the viewing angle of the flat-panel display body 100. A frictional force between the rotatable bracket 301 and other components of the first pivot subassembly 305 enable the display body 10 to retain at a desired position. An external force for rotating the rotatable bracket 301 may be changed by adjusting the adjustable nuts 3050 of the first pivot subassembly 305. The restricting block 3012 of the rotatable bracket 301 and the restricting groove 3541 of the limiting washers 354 cooperatively restrict the rotatable bracket 301 in limited adjusting range. A torsion force of the torsion spring 353 either increases or decreases according to the rotation of the rotatable bracket 301, thereby preventing an excessive force from damaging the first pivot subassembly 305.

Figure 6:
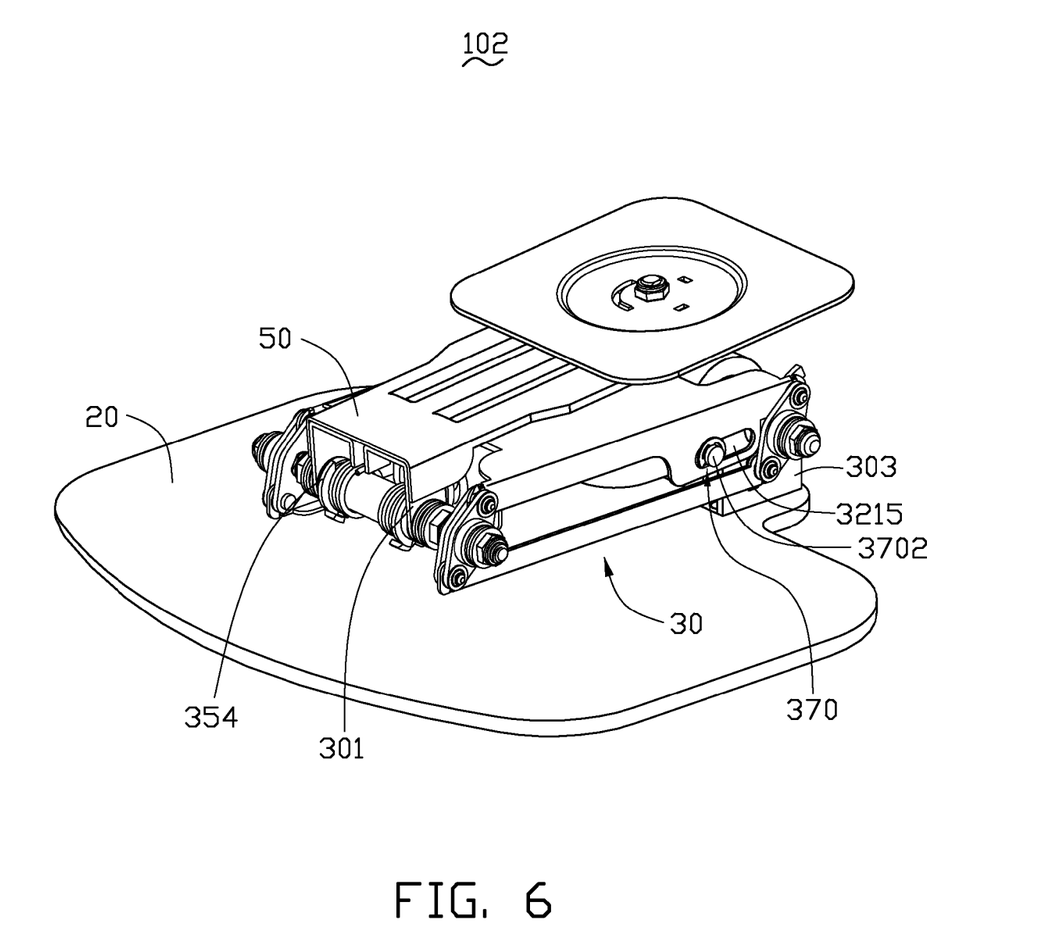
FIG. 6 is an assembled view of the stand support in FIG. 1, and showing the elevating support of the stand support rotated to a first utmost position (lowest position).

Referring to FIGS. 3 and 6, the elevating support 30 is in a first utmost position (lowest position), the restricting poles 3702 of the shaft 370 abut against the restricting holes 3215 and the restricting blocks 3012 of the rotatable bracket 301 abut against the restricting groove 3541 of the limiting washers 354, thereby restricting the rotatable bracket 301 together with the monitor bracket 50 in a minimum height. The monitor bracket 50, the elevating support 30, and the support member 20 are substantially parallel to each other, so that the package volume of the stand support 102 is decreased.

Referring also to FIGS. 1 and 2, when the height of the rotatable bracket 301 together with the display body 10 needs to increase, the display body 10 is pushed upwards so that the elevating support 30 is moved up to increase the height of the display body. During the moving of the bracket subassembly 302 of the elevating support 30, the spring 391 of the elastic subassembly 309 resists the resisting wall 3213 and the pressing block 393. A resisting force applied on the pressing block 393 indirectly acts on the connecting base 303 via the shaft 370, the roller 307, and the resisting member 308. A rebound force of the spring 391 indirectly applies on the bracket subassembly 302, so that an angle between the side walls 3212 of the first chassis 321 and the supporting subassemblies 323 connected to the connecting base 303 has a tendency of becoming larger. In other words, a distance between the first chassis 321 and the second chassis 322 has a tendency of becoming smaller. The bracket subassembly 302 always has a tendency of elevating. In addition, the rebound force of the spring 391 indirectly acted on the bracket subassembly 302 partially balances a gravitational force acting on the display body 10. When the display body 10 is lifted to a predetermined height, the display body 10 can be stably maintained at the predetermined height by frictional forces created by the first chassis 321, the second chassis 322, the supporting assemblies 323, and the second pivot subassembly 306.

When an external force is applied on the display 10 to make the rotatable brackets 301 rotate relative to the first pivot shaft 351 of the first pivot subassembly 305, the viewing angle of the display body 10 is adjusted. When the external force is released, frictional forces between the rotatable bracket 301 and components of the first pivot subassembly 305 enable the display body 10 to retain in a desired position.

In alternative embodiments, the elastic subassembly 309 may be omitted. In such cases, a torsion spring is disposed between the side wall 3212 of the first chassis 321 and the supporting subassembly 323. The torsion spring is sleeved on the second pivot shaft 361. Two ends of the torsion spring are fixed to the side wall 3212 of the first chassis 321 and the supporting subassembly 323 correspondingly, and the torsion spring is compressed between the first chassis 321 and the supporting subassembly 323 connected to the connecting base 303. The torsion spring is capable of exerting a rebound force on the side wall 3212 of the first chassis 321 and the supporting subassembly 323. The angle between the side walls 3212 of the first chassis 321 and the supporting subassemblies 323 has a tendency of becoming larger. Therefore, the distance between the first chassis 321 and the second chassis 322 has a tendency of becoming smaller. The rebound force of the torsion spring partially balances the gravitational force acting on the display body 10. Alternatively, the torsion spring may be replaced by a compression spring with two rings formed at distal ends. The two rings of the compression spring are fixed to the side wall 3222 of the second chassis 322 and the supporting subassembly 323 correspondingly.

Figure 7:
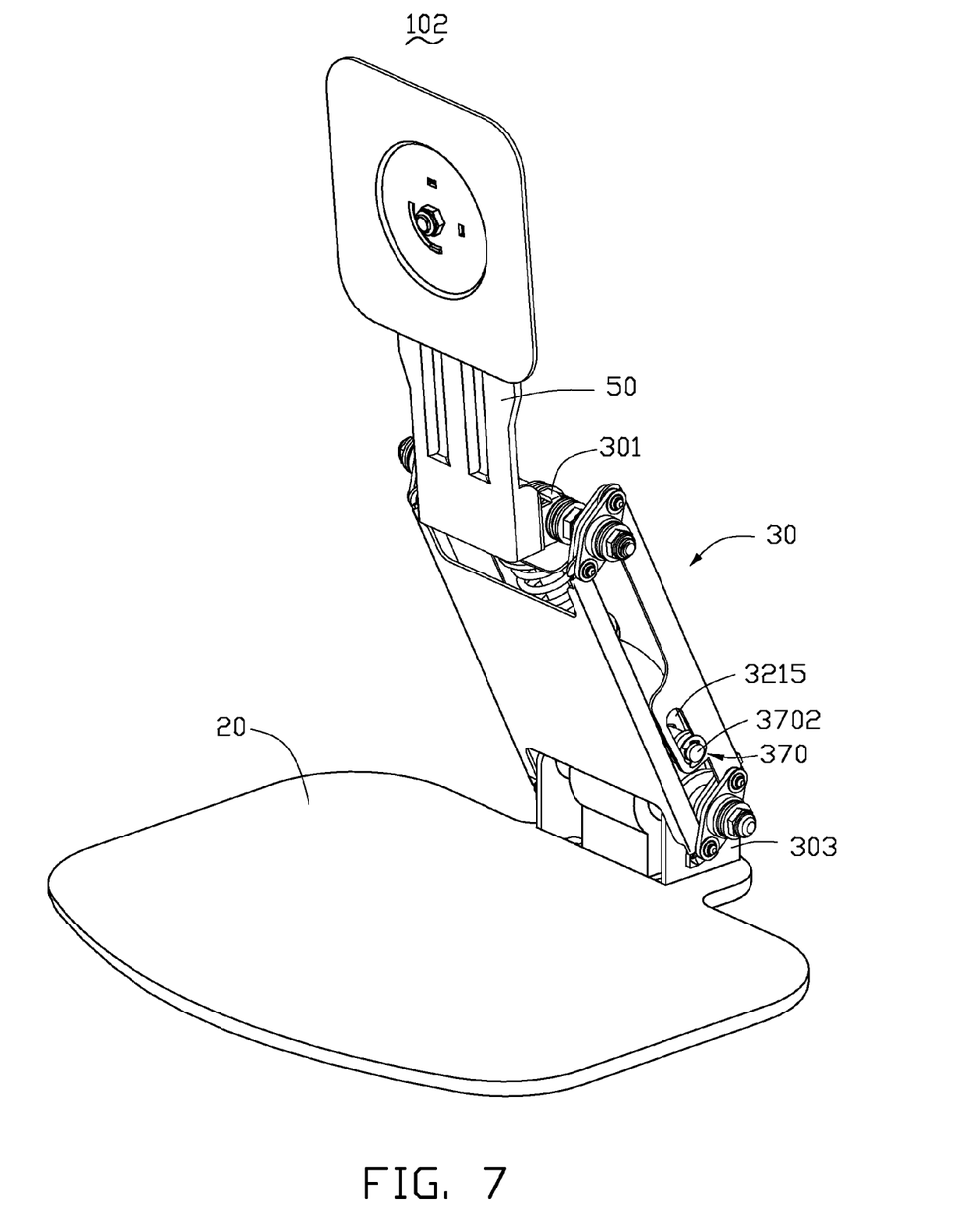
FIG. 7 is similar to FIG. 6, but showing the elevating support of the stand support rotated to a second utmost position (highest position).

Referring to FIGS. 3 and 7, the elevating support 30 is in a second utmost position (highest position), the restricting poles 3702 of the shaft 370 abut against the restricting holes 3215 and the restricting blocks 3012 of the rotatable bracket 301 abut against the restricting groove 3541 of the limiting washers 354, thereby restricting the rotatable bracket 301 together with the monitor bracket 50 in a maximum height.

A torsion force of the tension spring 353 either increases or decreases according to the motion of the elevating support 30, thereby further preventing an excessive force from damaging the elevating support 30. Therefore, the usage life of the elevating support 30 is prolonged. Further, the first and second utmost positions are restricted by the restricting poles 3702 abutting against the restricting grooves 3215 and the restricting blocks 3012 abutting against the restricting groove 3541, thus the elevating support 30 is effectively restricting between the first utmost position to the second utmost position. In other words, the display body can be adjusted between the minimum height and the maximum height.

Figure 8:
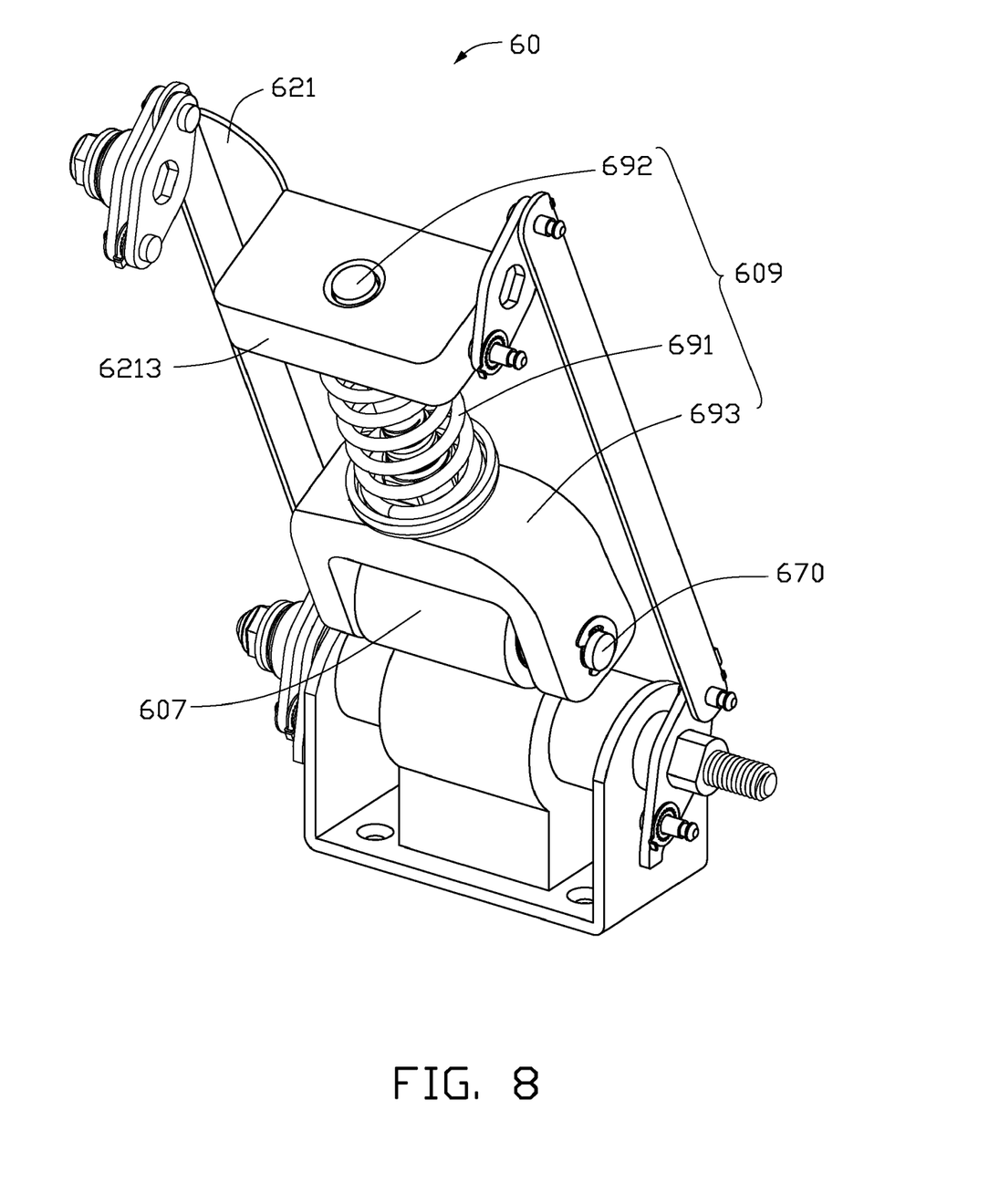
FIG. 8 is a partially assembled, isometric view of an elevating support in accordance with a second exemplary embodiment of the present invention.

Referring to FIG. 8, in a second exemplary embodiment, an elevating support 60 is similar in principle to the elevating support 30 except the following differences. Firstly, a resisting wall 6213 of a first chassis 621 is a cuboid block. Secondly, an elastic subassembly 609 includes a spring 691, a guiding shaft 692, and a pressing block 693. Each end of the pressing block 693 defines a shaft hole (not labeled) for inserting the shaft 670. A roller 607 is rotatably disposed between two ends of the pressing block 393 via the shaft 670. In such conditions, two side walls of the first chassis 621 do not define guiding slots.

Figure 9:
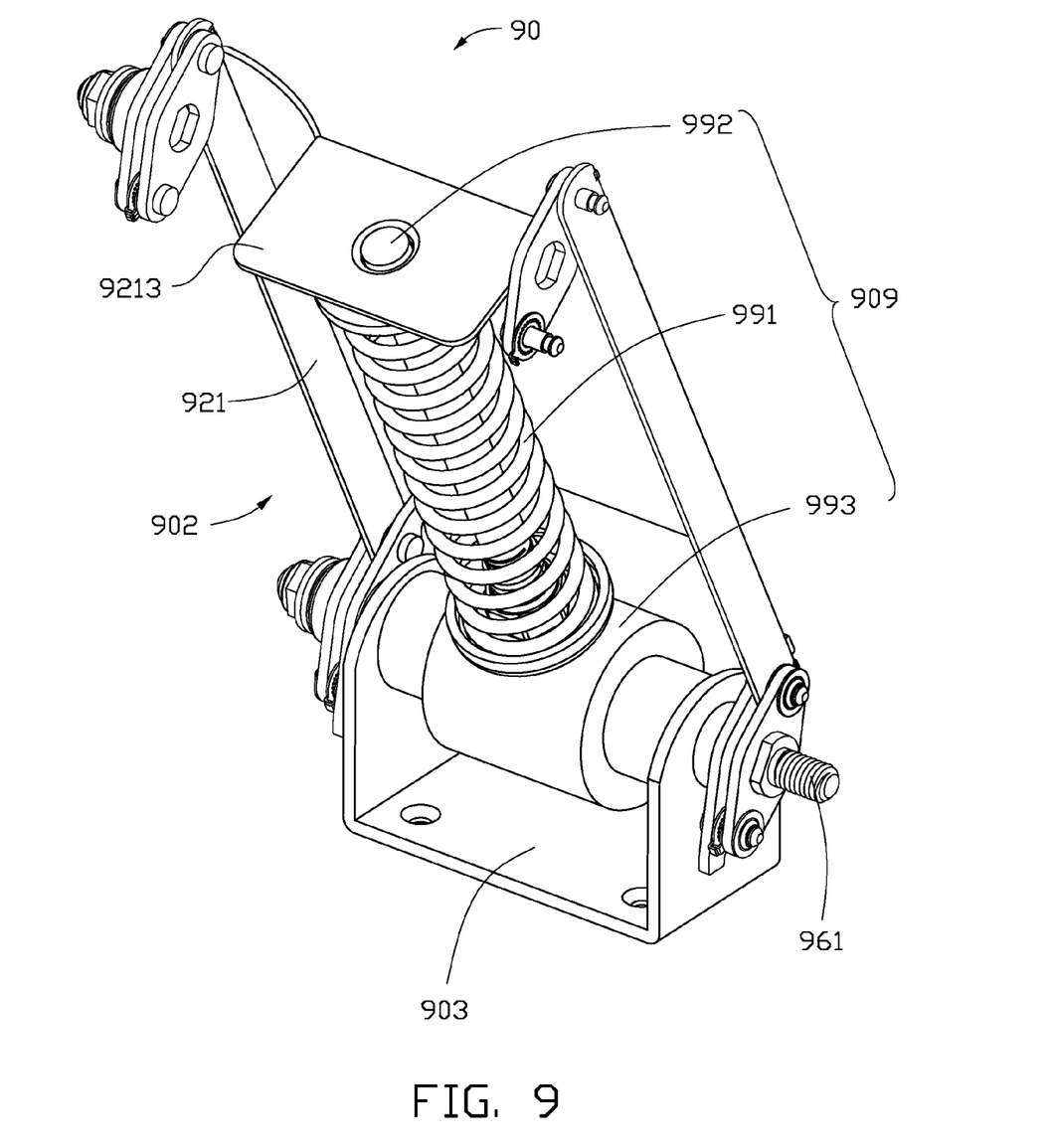
FIG. 9 is a partially assembled isometric view of an elevating support in accordance with a third exemplary embodiment of the present invention.

Referring to FIG. 9, an elevating support 90 in accordance with a third exemplary embodiment is shown. The elevating support 90 is similar in principle to the elevating support 30 except the following differences. Firstly, an elastic subassembly 909 of the elevating support 90 includes a spring 991, a guiding shaft 992, and a shaft sleeve 993. The spring 991 is sleeved on the guiding shaft 992. Two ends of the spring 991 resist a resisting wall 9213 of a first chassis 921 and the shaft sleeve 993 respectively. Two ends of the guiding shaft 992 are connected to the shaft sleeve 993 and the resisting wall 9213 of the first chassis 921. Secondly, the shaft sleeve 993 is sleeved on a second pivot shaft 961 of a second pivot subassembly. The elevating support 90 does not include a roller, a shaft extending through the roller, a resisting portion, and two guiding slots defined in the first chassis 921.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A support stand for a flat-panel display body, comprising:
    an elevating support, comprising a first chassis comprising a resisting wall, a second chassis, a plurality of supporting blocks for connecting end portions of the first chassis and the second chassis, a connecting base rotatably connected to the supporting blocks, an elastic member, a first pivot subassembly, a second pivot subassembly, a roller, a resisting member fixed to the connecting base, and a shaft; the elastic member being disposed between the resisting wall of the first chassis and the connecting base and capable of exerting a rebound force on at least two of the first chassis, the second chassis, and the supporting blocks to make the first chassis and the second chassis tend to elevate, the first pivot subassembly being fixed to the supporting blocks connected to a first end portion of the first chassis and the second chassis, and the second pivot subassembly being fixed to the supporting blocks connected to a second end portion of the first chassis and the second chassis opposite to the first end portions; the roller being rotatably connected to the first chassis via the shaft, two ends of the elastic member resisting the resisting wall of the first chassis and the roller correspondingly, and the roller being rotatable relative to the resisting member;
    a monitor bracket rotatably connected to the first pivot subassembly; and
    a support member rotatably connected to the second pivot subassembly.

2. The support stand as claimed in claim 1, wherein the first chassis includes a flat base and two side walls extending from opposite sides of the flat base, each of the side walls defines a guiding slot, and opposite ends of the shaft are slidably received in the guiding slot correspondingly.

3. The support stand as claimed in claim 2, wherein the elevating support further comprises a guiding shaft and a pressing block, the resisting wall of the first chassis defines a through hole, the top end of the guiding shaft is inserted into the through hole, the bottom end of the guiding shaft is fixed to the pressing block, the pressing block is substantially U-shaped, and each end of the pressing block defines a holding groove for resisting the shaft.

4. The support stand as claimed in claim 1, wherein the first pivot subassembly includes a pivot shaft, the elevating support further comprises a rotatable bracket rotatably sleeved on the pivot shaft.

5. The support stand as claimed in claim 1, wherein the first pivot subassembly includes a first pivot shaft, a sleeve sleeved on the first pivot shaft, a torsion spring sleeved on the sleeve, and two first hinge subassemblies attached to opposite shaft portions of the first pivot shaft.

6. The support stand as claimed in claim 1, wherein the first pivot assembly further includes an elastic member being a torsion spring, two ends of the torsion spring are fixed to the first chassis and the supporting blocks adjacent to the first chassis, and a rebound force of the torsion spring acts on the first chassis and the supporting blocks.

7. The support stand as claimed in claim 6, wherein the second pivot subassembly includes a second pivot shaft, the torsion spring is sleeved on the first pivot shaft.

8. The support stand as claimed in claim 7, wherein the elastic member is a compression spring with two rings formed at distal ends, the rings of the compression spring are fixed to the second chassis and the supporting blocks adjacent to the second chassis.

9. An elevating support, used for a support stand of a flat-panel display body, the elevating support comprising:
    a rotatable bracket;
    a first chassis including end portions and a resisting wall;
    a second chassis including end portions;
    a plurality of supporting blocks for connecting the end portions of the first chassis and the second chassis;
    an elastic member, the elastic member being capable of exerting a rebound force on at least two of the first chassis, the second chassis, and the supporting blocks to make the first chassis and the second chassis tend to elevate;
    a first pivot subassembly fixed to the supporting blocks that connected to a first end portion of the first chassis and the second chassis;
    a second pivot subassembly fixed to the supporting blocks that connected to a second end portion of the first chassis and the second chassis opposite to the first end portions;
    at least one rotatable bracket rotatably connected to the first pivot subassembly;
    a connecting base rotatably connected to the second pivot subassembly and rotatably connected to the supporting blocks;
    a resisting member fixed to the connecting base;
    a shaft; and
    a roller rotatably connected to the first chassis via the shaft, wherein the elastic member is disposed between the resisting wall of the first chassis and the connecting base, two ends of the elastic member resisting the resisting wall of the first chassis and the roller correspondingly, and the roller being rotatable relative to the resisting member.

10. The elevating support as claimed in claim 9, wherein the first chassis includes a flat base and two side walls perpendicularly extending from opposite sides of the flat base, each of the side walls defines a guiding slot, and two ends of the shaft are slidably received in the guiding slot correspondingly.

11. The elevating support as claimed in claim 10, wherein the elevating support further comprises a guiding shaft and a pressing block, the resisting wall of the first chassis defines a through hole, the top end of the guiding shaft is inserted into the through hole, the bottom end of the guiding shaft is fixed to the pressing block, the pressing block is substantially U-shaped, and each end of the pressing block defines a holding groove for resisting the shaft.

12. The elevating support as claimed in claim 9, wherein the first pivot subassembly comprises a pivot shaft and two limiting washers, each of the limiting washers defines a restricting groove, the number of the at least one rotatable bracket is two, the rotatable bracket is sleeved on the pivot shaft, each of the rotatable brackets forms a restricting block, and the restricting block of the rotatable bracket and the restricting groove of the limiting washers cooperatively restrict the rotatable bracket in limited adjusting range.

13. The elevating support as claimed in claim 12, wherein the first pivot subassembly further comprises a torsion spring and a sleeve, the sleeve is sleeved on the pivot shaft, the torsion portion has two torsion portions and an n-shaped connecting portion for connecting the two torsion portions, each of the torsion portions of the torsion spring comprises a latching end for abutting against the limiting washers, and the n-shaped connecting portion is fixed to the rotatable bracket.

14. The elevating support as claimed in claim 9, wherein the first pivot subassembly includes a first pivot shaft, a sleeve sleeved on the first pivot shaft, a torsion spring sleeved on the sleeve, two first hinge subassemblies attached to opposite shaft portions of the first pivot shaft, and the torsion spring either increases or decreases according to the rotation of the rotatable bracket, thereby preventing an excessive force from damaging the first pivot subassembly.

* * * * *